United States Patent Office
3,086,034
Patented Apr. 16, 1963

3,086,034
PREPARATION OF CYCLOMATIC NICKEL NITROSYLS
Jerome E. Brown, Detroit, Mich., and Earl G. De Witt and Hymin Shapiro, Baton Rouge, La., assignors to Ethyl Corporation, New York, N. Y., a corporation of Delaware
No Drawing. Filed July 1, 1959, Ser. No. 824,214
7 Claims. (Cl. 260—439)

This invention relates to a new and improved chemical process. More specifically, this invention relates to a novel process for forming cyclomatic nickel nitrosyl compounds which have great utility as antiknock additives in gasoline.

An object of this invention is to provide a new and useful process for forming organometallic coordination compounds. A further object of this invention is to provide a process for forming cyclomatic nickel nitrosyl compounds. Further objects will become apparent from a reading of the specification and claims which follow.

This application is a continuation-in-part of our co-pending application 701,311, filed December 9, 1957, which is in turn a continuation-in-part of our application 325,224, filed December 10, 1952, now U.S. Patent 2,818,-416.

In our prior application 325,224, we have described a new class of metallic cyclomatic compounds as well as methods for their preparation. The new class of compounds is therein defined as having the general formula $MA_xB_yC_z$ wherein M is a metal, A is a cyclomatic hydrocarbon radical and each of B and C can be the same or different and is an electron donating group different from a cyclomatic radical such that $a_n$ plus $5x$ plus $py$ plus $qz$ equals S, wherein S is the atomic number of an inert gas of the $n$th period, $x$ is a small whole integer from one to two inclusive, $y$ is a small whole integer from one to four inclusive, $z$ is a small whole integer from zero to four inclusive, $n$ is a period of the periodic table and is greater than one, $p$ and $q$ are the number of electrons donated by B and C respectively, and $a_n$ is the atomic number of M and is defined such that $a_n$ is within the parameters $(S_{n-1}+1)$ and $(S_{n-6})$. Among the compounds disclosed in our prior application are those wherein M is nickel, A is the cyclopentadienyl radical, $x$ is equal to one, B is the nitrosyl group, $y$ is equal to one and $z$ is equal to zero. A specific example is cyclopentadienyl nickel nitrosyl (line 28, column 12 of the Patent 2,818,416).

In our prior application 701,311, we disclose cyclomatic organometallic compounds having the general formula $MAB_yC_z$ wherein M is a transition metal of groups VIII and IB of the periodic table. These compounds represent a preferred species of the generic invention disclosed in our application 325,224. In the formula $MAB_yC_z$, B and C are electron donating groups other than a cyclomatic group, $y$ is a small integer ranging from one to five inclusive and $z$ is a small integer ranging from zero to two inclusive. A is a cyclomatic hydrocarbon group which can be represented by the formulae:

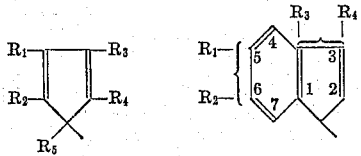

where the R's are selected from the group consisting of hydrogen and univalent organic hydrocarbon radicals. As further shown in our co-pending application, a preferred class of cyclomatic radicals suitable in forming the compounds $MAB_yC_z$ are those which contain from about five to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. These radicals are preferred as substituent groups since they are derived from the more readily available cyclomatic compounds. Further, metallic cyclomatic coordination compounds containing these groups have the more desirable characteristics of volatility and solubility which are prerequisities for superior hydrocarbon additives.

Among the compounds disclosed in our co-pending application are those in which M is nickel, A is the cyclopentadienyl moiety, B is the nitrosyl group, $y$ is equal to one and $z$ is equal to zero. A specific example is cyclopentadienyl nickel nitroyl disclosed in Example II of the application.

As disclosed in our prior applications, the cyclomatic metal coordination compounds defined therein can be prepared by concurrently introducing into either a metallic compound, a metal per se or an active form thereof, a cyclomatic group or groups and an electron donating group or groups. As a typical example, there is disclosed on page 8 of our co-pending application the reaction of a cobalt compound such as cobaltous chloride, a cyclomatic Grignard reagent and carbon monoxide to yield a cyclomatic cobalt carbonyl such as cyclopentadienyl cobalt dicarbonyl. A further example, as set forth on page 9 of our co-pending application, discloses reaction of cuprous chloride, a cyclomatic Grignard reagent and carbon monoxide to yield a compound such as cyclopentadienyl copper carbonyl. On the same page is disclosed reaction of copper with a cyclomatic hydrocarbon and carbon monoxide to prepare a compound such as (2-methylcyclopentadienyl) copper carbonyl. A similar preparation is also desribed for a cyclomatic cobalt carbonyl such as (2-methylcyclopentadienyl) cobalt dicarbonyl by reaction of cobalt with a cyclomatic hydrocarbon and carbon monoxide.

In this application, we wish to specifically claim another preferred embodiment of this reaction. In this preferred embodiment, the metallic compound is nickel tetracarbonyl, the cyclomatic group is supplied by a cyclomatic hydrocarbon (cyclopentadiene or a substituted cyclopentadiene) and the electron donating group is the nitrosyl group, supplied by nitric oxide.

Although we do not intend to be bound by any theory involving the reaction disclosed and claimed herein, it is believed to occur in the following reaction sequence:

$$2C_5H_6+2Ni(CO)_4+2NO \rightarrow 2C_5H_5NiNO+H_2+8CO$$

The reactant, nickel tetracarbonyl, has some tendency toward decomposition which can be prevented by several means such as keeping in the system an atomsphere containing carbon monoxide as a substituent. The overall reaction is somewhat reversible, however, and large quantities of carbon monoxide may tend to diminish the yield of the cyclomatic nickel nitrosyl compound. It is, therefore, undesirable to have excessively large quantities of carbon monoxide present in the reaction mixture.

The cyclomatic hydrocarbon compound (shown as $C_5H_6$ in the above depicted reaction) yields a cyclomatic radical which, as described in our co-pending application 701,311 may contain from about five to about 13 carbon atoms and may be substituted with hydrogen and univalent organic radicals. Typical of the compounds yielding such cyclomatic radicals are cyclopentadiene, indene, methylcyclopentadiene, propylcyclopentadiene, diethylcyclopentadiene, phenylcyclopentadiene, tert-butyl cyclopentadiene, p-ethylphenyl cyclopentadiene, 4-tert-butyl indene and the like. When utilized as reactants in our process, these typical compounds react with nitric oxide and nickel tetracarbonyl to yield respectively cyclopentadienyl nickel nitrosyl, indenyl nickel nitrosyl, methylcyclopentadienyl nickel nitrosyl, propylcyclopentadienyl nickel nitrosyl, diethylcyclopentadienyl nickel nitrosyl, phenylcyclopentadienyl nickel nitrosyl, tert-butyl cyclopentadienyl nickel nitrosyl, p-ethylphenyl cyclopentadienyl nickel nitrosyl, 4-tert-butyl indenyl nickel nitrosyl and the like.

A preferred embodiment of our invention involves the use of cyclopentadiene as a reactant in our process since it is a readily available chemical of commerce. Further, the product, cyclopentadienyl nickel nitrosyl, formed when using cyclopentadiene as the reactant is an extremely potent antiknock having great utility as a gasoline additive.

Our process may be carried out as a gas or liquid phase reaction. When carried out essentially as a liquid phase reaction, the reaction is best conducted in an autoclave. The autoclave is equipped with inlet and outlet ports, pressure controls connected with said ports so that the pressure can be maintained constant in the autoclave, temperature controls, and agitation means which disperse the reactants so that they intimately contact each other. A solvent is preferably used as a dispersant for the reactants in our process, although the process may be conducted without it. The solvent should be substantially free of air or oxygen, and this may be conveniently accomplished by bubbling carbon monoxide through it or by heating it so as to expell any absorbed gases.

The nature of the solvent which may be used in our process is not critical. In general, any solvent can be utilized which does not react with the reactants employed in our process. Typical of applicable solvents are hydrocarbon and ether solvents. The hydrocarbon solvents may be aliphatic hydrocarbons such as n-hexane, n-octane, isooctane, n-heptane, various positional isomers of hexane, octane and heptane, or mixtures of the above. The solvent may also be a cycloaliphatic hydrocarbon such as cyclohexane or methylcyclohexane. Further applicable solvents are cyclic olefins such as cyclohexene and methylcyclohexene. Straight and branched-chain olefins such as isoheptene, n-hexene, isooctene, isoheptene and the like are also applicable. Aromatic solvents such as benzene, toluene, ethylbenzene and xylenes, ether mixed or separated, may also be used.

Typical of the ether solvents are the cyclic ethers such as tetrahydrofuran, 1,4-dioxane and 1,3-dioxane. Non-cyclic mono-ethers such as diethylether, diisopropylether and diphenylether are good solvents for use in our process. Non-cyclic polyethers such as the dimethylether of ethyleneglycol, the diethylether of ethyleneglycol, the dibutylether of ethyleneglycol, the dimethylether of diethyleneglycol, the diethylether of diethyleneglycol and the dibutylether of diethyleneglycol are also excellent solvents for use in our process.

A preferred group of solvents for use in our process are the highly polar ethers such as tetrahydrofuran, ethyleneglycol dimethylether, ethyleneglycol diethylether, ethyleneglycol dibutylether, diethyleneglycol dimethylether, diethyleneglycol diethylether, diethyleneglycol dibutylether and the like.

Solvents used in our process should preferably have a normal boiling point which varies by at least 25° C. from the normal boiling point of the product. A variation of at least 25° C. between the normal boiling points of the product and solvent aids greatly in separation of the product from the solvent by means of distillation.

Ordinarily, excess cyclomatic compound and nitric oxide are used as reactants with respect to the nickel tetracarbonyl. The nickel tetracarbonyl is the most expensive reactant in the process and the use of excess quantities of the other reactants insure that the nickel carbonyl is consumed in the process. Generally, therefore, one to eight moles of nitric oxide and one to two moles of cyclomatic compound are used for each mole of nickel tetracarbonyl used in the process. Greater or lesser quantities of cyclomatic compound and nitric oxide may be used but are generally not found necessary. In some cases, it may be desirable to feed the cyclomatic compound to the autoclave in incremental portions.

In conducting our process, it is desirable that air be excluded from the reaction mixture. This is accomplished by employing, as a blanketing gas, a mixture of nitric oxide and carbon monoxide. Nitric oxide is initially the major constituent in the blanketing gas and is consumed as a reactant while the reaction proceeds. As the reaction proceeds, carbon monoxide is produced as a product. The presence of excess quantities of carbon monoxide may tend to decrease the yield of the desired cyclomatic nickel nitrosyl compounds. It may be necessary, therefore, to periodically feed in more nitric oxide to the reaction mixture so as to prevent the concentration of carbon monoxide from becoming too great. Further, it may be necessary during the course of the reaction to vent off gases from the autoclave and run them through a scrubber so as to remove hydrogen. The gases may then be recycled at a controlled rate to the autoclave. The rate of recycle can be set by the quantity of carbon monoxide present in the reaction system. Since the recycle gases are relatively rich in carbon monoxide, they should not be fed too rapidly to the autoclave since this could result in raising the concentration of carbon monoxide in the reaction system to a point where it could adversely affect the yields of desired products.

It is preferred that the reaction mixture be constantly agitated in order to insure homogeneity of the reaction mass and intimate contacting of the reactants. Since the autoclave reaction is carried out in a liquid system using some gaseous reactants, agitation insures that the liquid and gaseous reactants contact each other and react in the desired manner. Without agitation, the gaseous reactants tend to collect in the upper portion of the autoclave whereas the liquid reactants settle to the bottom of he auoclave. When his occurs, the reaction rate is radically diminished. Agitation is, therefore, very desirable in order to assure a high, continuous reaction rate.

The nickel tetracarbonyl employed as a reactant is an extremely toxic chemical. It is convenient, therefore, in many cases to produce nickel carbonyl in an adjoining reactor and to pipe it directly into the autoclave. It may be prepared in the adjoining reactor by any of several well-known methods. Typical of such well-known methods are the reaction of carbon monoxide and finely-divided active nickel produced by reduction of a nickel compound such as nickel formate, nickel oxalate, nickel nitrate, nickel sulfate and the like. The carbon monoxide produced as a product in our reaction may be recycled to the reactor in which nickel carbonyl is prepared. In this manner, it is economically utilized in the production of the nickel carbonyl reactant.

The cyclomatic reactant can be formed by cracking the dimer in which form the compounds normally occur. The cracking operation may be carried out at a temperature in the vicinity of 175° C. in a still adjoining the autoclave and the monomer may be piped directly to the autoclave. The sensible heat of the cyclomatic monomer is thereby employed in supplying heat to the reaction mixture present in the autoclave.

The reaction temperature in the autoclave is maintained between about 25° C. and about 180° C. Although the reaction goes readily over this wide range, a preferred temperature range is between about 35 to about 85° C. As the temperature of the reaction mixture is increased, the reaction rate increases. It could, therefore, be assumed that the higher the temperature, the better would be the overall results from our process. This is not completely true, however, since at higher temperatures, nickel tetracarbonyl has a greater tendency toward decomposition. This tendency can be offset by increasing the concentration of carbon monoxide in the blanketing gas. Thus, the reaction temperature employed and the concentration of carbon monoxide in the blanketing gas are interrelated. When using higher temperatures, we employ a higher concentration of carbon monoxide in the blanketing gas so as to avoid excessive decomposition of the nickel carbonyl.

Our process may be carried out under pressures ranging from about 0.3 to about 100 atmospheres. Normally, however, the reaction is carried out at atmospheric or slightly higher pressures. Slight pressure is preferably maintained on the system through the presence of the blanketing gas comprising a mixture of nitric oxide and carbon monoxide.

The order of addition for the reactants in our process is not critical. Thus, the nickel carbonyl, cyclomatic compound and nitric oxide, can be added simultaneously or sequentially as by adding the nickel carbonyl to the cyclomatic compound and then adding nitric oxide, adding the nitric oxide to the nickel carbonyl and then adding the cyclomatic compound or by adding the nitric oxide to the cyclomatic compound and subsequently adding nickel carbonyl.

Our cyclomatic nickel nitrosyl products are separated from the essentially liquid reaction mass by conventional means. Typical of the separation means which may be employed are chromatography, steam distillation, distillation, or extraction followed by distillation. Distillation is the preferred mode of separation.

To further illustrate our process involving essentially a liquid phase reaction in an autoclave, there are presented the following examples. In these examples, all parts and percentages are by weight unless otherwise indicated.

*Example I*

Seven and four tenths moles of nickel tetracarbonyl, 170 moles of tetrahydrofuran and 15 moles of cyclopentadiene were charged to a reaction vessel. The reaction mixture was stirred at a temperature of 65° C. and nitric oxide was bubbled into the agitated mass. The stirring was continued for five hours at essentially atmospheric pressure whereupon the reaction vessel was discharged. The solvent was distilled off at atmospheric pressure, and the residues were extracted with carbon tetrachloride. The carbon tetrachloride solvent was then dried over magnesium sulfate and charged to a fractionating column. In the column, residues were removed which were distilled to yield cyclopentadienyl nickel nitrosyl. This product was a red liquid having a boiling point of 62–63° C. at 30 millimeters. Its structure was proved by means of vapor chromatographic comparison with a known sample of cyclopentadienyl nickel nitrosyl.

*Example II*

Into an evacuated autoclave equipped with means for agitation, inlet and outlet ports and temperature and pressure controls are charged one and one-quarter moles of cyclopentadiene, one mole of nickel tetracarbonyl and two moles of tetrahydrofuran. The temperature is adjusted to 45° C., and the autoclave is charged with nitric oxide to a pressure of 24.6 atmospheres. The autoclave is stirred until the internal pressure reaches about 100 atmospheres. It is then cooled, and the internal gases are vented off. The reaction product is distilled to separate the solvent from the product, cyclopentadienyl nickel nitrosyl. A good yield of product is obtained.

*Example III*

One and one-quarter moles of cyclopentadiene, one mole of nickel tetracarbonyl, two moles of tetrahydrofuran and 1.1 moles of nitric oxide are charged to an evacuated autoclave whose temperature is maintained at 25° C. The autoclave is equipped with inlet and discharge ports, temperature regulating means, pressure regulating means and an agitator. After charging the autoclave, it is agitated until the pressure build-up reaches 60 atmospheres. The pressure is then bled off until the internal pressure of the autoclave is 40 atmospheres. The discharged gases are passed through a cold trap where nickel tetracarbonyl is collected and returned to the autocalve. Additional nitric oxide is admitted to the autoclave until its pressure reaches 45 atmospheres. Agitation is then continued, and the pressure is allowed to build up again to 60 atmospheres. The process of bleeding off the pressure from 60 to 40 atmospheres and recharging with nitric oxide to a pressure of 45 atmospheres is repeated until no further pressure increase is noted. At this point, the autoclave is discharged, and the product, cyclopentadienyl nickel nitrosyl, is separated by distillation. A good yield of cyclopentadienyl nickel nitrosyl is obtained.

*Example IV*

One mole of cyclopentadiene, one mole of nickel tetracarbonyl and five moles of benzene are charged to an autoclave maintained at 45° C. This autoclave is equipped similarly to those described in the preceding examples. After stirring for one-half hour, the autoclave is charged with one and one-half moles of nitric oxide, the initial pressure in the autoclave is three atmospheres. The reaction mixture is agitated, and the pressure is allowed to increased to five atmospheres. The pressure is then bled off until the internal autoclave pressure reaches two and one-half atmospheres. The out gases are passed through a Dry-Ice trap where nickel tetracarbonyl is separated off and fed back into the autoclave. One mole of cyclopentadiene and additional nitric oxide are then charged to the autoclave until its internal pressure reaches three atmospheres. With agitation, the pressure is allowed to build up to five atmospheres whereupon the system is bled back to two and one-half atmospheres, recharged with nitric oxide to three atmospheres internal pressure, and the process is repeated. This cycling operation is repeated until no further pressure rise is noted in the autoclave. At this point, the autoclave is discharged and a good yield of product, cyclopentadienyl nickel nitrosyl, is separated from the solvent by means of distillation.

*Example V*

One and one-tenth moles of methyl cyclopentadiene, and five moles of nitric oxide are charged to an autoclave maintained at 125° C. and having an initial pressure of one atmosphere. The mixture is not agitated. One mole of nickel tetracarbonyl is then added. The internal pressure of the autoclave is observed while reaction is taking place. When no further pressure rise is noted, the autoclave is cooled to about room temperature, and the gases are vented off through a cold trap where unreacted nickel tetracarbonyl is separated. The out gases, after passing through the cold trap, are recycled for further use in the process. The product, methyl cyclopentadienyl nickel nitrosyl, is separated from the residues by distillation.

*Example VI*

Two moles of nickel tetracarbonyl, one mole of indene and three moles of ethyleneglycol dimethylether are charged to an evacuated autoclave maintained at one atmosphere of pressure. 3.5 moles of nitric oxide are subsequently introduced into the reaction mixture by bubbling in below liquid level. After passing through the reaction mixture, the gases are drawn off from the system and recycled back into the autoclave. During this time, the temperature is allowed to rise slowly to 85° C. When no further reaction is observed, the autoclave is cooled, and the gases in the system are passed through a cold trap to separate out any unreacted nickel tetracarbonyl. The product, indenyl nickel nitrosyl, is obtained in good yield by distillation from the residues.

In the general process illustrated by the preceding examples, various cyclopentadiene compounds can be utilized as reactants in producing a cyclopentadienyl nickel nitrosyl compound. For example, the use of benzyl cyclopentadiene, tert-butyl cyclopentadiene, isopropyl cyclopentadiene and ethyl cyclopentadiene as reactants produce respectively the compounds benzyl cyclopentadienyl nickel nitrosyl, tert-butyl cyclopentadienyl nickel nitrosyl, isopropyl cyclopentadienyl nickel nitrosyl and ethyl cyclopentadienyl nickel nitrosyl. Likewise, the use of 2,3-diethylindene, cyclohexylcyclopentadiene, and tetramethylcyclopentadiene as reactants in the above process produce respectively 2,3-diethylindenyl nickel nitrosyl, cyclohexylcyclopentadienyl nickel nitrosyl and tetramethylcyclopentadienyl nickel nitrosyl.

As stated above, one mode of conducting our process is that of carrying it out essentially in the gas phase. In this embodiment, nitric oxide, gaseous cyclopentadiene and gaseous nickel tetracarbonyl are fed through an externally heated tube reactor which may be packed with materials such as Raschig rings, Berl saddles or the like to insure intimate mixing of the reactant gases. The throughput of reactants is controlled so that the temperature of the gases in the tube is within the temperature range of about 45 to about 175° C. Preferably, the throughput and external heating elements surrounding the tube reactor are controlled so that the temperature of the reactant gases is maintained between about 80 to about 120° C. This temperature range is preferred since it results in excellent yields of products, with a minimum of undesirable side reactions. Pressures up to 50 atmospheres may be employed although the process is preferably conducted at atmospheric pressure or slightly above.

The cyclopentadiene reactant utilized in this process may, as stated previously, be substituted with alkyl, aryl or cycloalkyl substituents. Further, the cyclopentadiene reactant may contain from about five to about 13 carbon atoms. This reactant is conveniently produced by cracking the dimeric form of the cyclopentadiene or substituted cyclopentadiene compound. The cracking operation may be performed in a still adjacent the tube reactor. Since the cracking temperature is in the order of 175° C., the sensible heat of the cyclopentadiene monomer may be utilized to heat the other gas streams entering the tube reactor.

Optionally, an inert carrier gas may be employed in our gas phase reaction. The carrier gas, which may be any inert gas such as nitrogen, argon or krypton or the like, which is swept through the tube reactor along with the reactants and products issuing therefrom. The function of the carrier gas is to sweep out any liquid formed in the reactor so that it is easily removed at a later stage and does not collect in the reactor. Preferably, the cyclopentadiene and nitric oxide are employed in excess quantities since it is desirable that the nickel tetracarbonyl be fully consumed. Thus, the molar ratio between nitric oxide and nickel carbonyl used generally ranges from about 1:1 to about 8:1, and the molar ratio of the cyclopentadiene compound to nickel tetracarbonyl can range from about 1:1 to about 2:1. If desired, however, greater or lesser quantities of these reactants can be used.

The cyclopentadienyl nickel nitrosyl compounds formed in our gas phase process have higher boiling points than the reactants employed. The products, therefore, are readily separated from the gaseous stream emerging from the reactor. This separation may be effected by passing the out gases through a filter and further through a condenser. After passing through the filter and condenser, the out gases are then passed through a scrubber where the hydrogen formed in the reaction is removed. The gases, which are then largely carbon monoxide, may be recycled to the entrance gases entering the tube reactor. It is desirable that carbon monoxide be present at all times in the reactor since its presence helps to prevent decomposition of nickel tetracarbonyl. Its concentration should not be too high, however, or it may tend to decrease the yields of cyclopentadienyl nickel nitrosyl products. The recycle rate is controlled, therefore, so that the mole ratio of carbon monoxide to nickel carbonyl in the reactor is not so high as to adversely affect the reaction.

Our process involving the gas phase reaction of nickel tetracarbonyl, nitric oxide and a cyclopentadiene compound is further illustrated by the following examples. In these examples, all parts and percentages are by weight unless otherwise indicated.

*Example VII*

Two and two tenths moles of nitric oxide, two moles of nickel tetracarbonyl and 2.2 moles of cyclopentadiene are fed in a gaseous state into a tube reactor packed with particulate material. The tube reactor is equipped with external heating coils and pressure control means. The gaseous reactants are heated to 65° C. in the reactor at a pressure of one atmosphere. The exit gases are passed through a cold trap where the product, cyclopentadiene nickel nitrosyl, is recovered in good yield.

*Example VIII*

Eight moles of nitric oxide, one mole of nickel tetracarbonyl and two moles of ethylcyclopentadiene are fed in the gaseous state to a tube reactor equipped as in the previous example. The gases are heated to a temperature of 120° C. at a pressure of one atmosphere. The exit gases are passed through a cold trap where the product, ethylcyclopentadienyl nickel nitrosyl, is recovered in good yield. The exit gases are then passed through a hydrogen scrubber and recycled to the tube reactor.

*Example IX*

Four moles of nitric oxide, one mole of nickel tetracarbonyl and 1.5 moles of methylcyclopentadiene are fed in the gaseous state into a tube reactor equipped as in the previous examples. Also fed into the tube reactor are two moles of nitrogen. The gases are heated to a temperature of 80° C. at a pressure of 1.1 atmospheres. The out gases are passed through a cold trap where the product, methylcyclopentadienyl nickel nitrosyl, is recovered in good yield. After passing through the cold trap, the out gases are scrubbed to remove hydrogen and recycled to the tube reactor.

*Example X*

Four and one-half moles of nitric oxide, three moles of nickel tetracarbonyl and 3.75 moles of 1-methyl-3-isopropylcyclopenta-1,3-diene are fed in the gaseous state to a tube reactor equipped as in the previous examples. The gases are heated to a temperature of 175° C. at a pressure of one atmosphere. The product, 1-methyl-3-isopropylcyclopenta-1,3-dienyl nickel nitrosyl, is recovered in good yield after passing the exit gases through a cold trap. The gases are then scrubbed and recycled to the tube reactor.

*Example XI*

The process of Example VII is repeated with the exception that the gases are heated to a temperature of 45° C. in the tube reactor. Good yields of cyclopentadienyl nickel nitrosyl are separated from the exit gases.

*Example XII*

Seven moles of nitric oxide, one mole of nickel tetracarbonyl and 1.8 moles of cyclopentadiene are fed to a tube reactor equipped as in the preceding examples. The gases are heated to a temperature of 85° C. at a pressure of five atmospheres in the reactor. The exit gases are passed through a cold trap where the product, cyclopentadienyl nickel nitrosyl, is recovered in good yield. The gases, after passing through the cold trap, are recycled to the tube reactor.

A still further variation which may be employed in our process involves the use of countercurrent reactant streams. In this embodiment a vertical column may be employed which can be packed with particulate material. Gaseous nickel carbonyl and nitric oxide in a mole ratio of about one to about eight moles of nitric oxide per mole of nickel tetracarbonyl are fed upwardly through the column. Flowing downwardly through the column is a stream of a substiuted cyclomatic compound as previously described. The temperature of the cyclopentadiene stream is maintained at temperatures above about 45° C. The column may be pressurized although this is not normally necessary.

The cyclopentadiene reactant is present in a mole ratio to nickel carbonyl of about 1:1 to about 50:1. A neutral solvent, as previously defined, may be used as a diluent for the stream of cyclopentadiene compound. The liquid, cyclopentadienyl nickel nitrosyl compound, admixed with unreacted cyclopentadiene compound and solvent are drawn off from the bottom portion of the column. This stream can be fractionated to separate the product from the solvent and unreacted cyclopentadiene compound. After fractionation, the solvent and cyclopentadiene compound can be returned to the upper portion of the columns for recycle. The gas stream of unreacted nickel carbonyl, nitric oxide, carbon monoxide and hydrogen emerging from the top of the column can be recycled back to the bottom of the column. In some cases, it may be desirable to remove carbon monoxide and hydrogen from this stream before recycling to the column.

Although our process has been illustrated only with respect to the formation of nickel compounds, it works equally as well in producing similar compounds of platinum and palladium.

The cyclomatic nickel nitrosyl compounds formed by the process of our invention have great utility as antiknock agents in hydrocarbon fuels. One of the compounds, cyclopentadienyl nickel nitrosyl, formed by our process was tested as a gasoline additive according to the Research Method. The Research Method of determining octane number of a fuel is generally accepted as a test method which gives a good indication of fuel behavior in full scale automotive engines under normal driving conditions. It is the method most used by commercial installations in determining the value of a gasoline additive. The Research Method is conducted by use of a single cylinder engine especially designed for this purpose and referred to as the CFR engine. This engine has a variable compression ratio and during the test, the temperature of the water jacket is maintained at 212° F. and the inlet air temperature is maintained at 125° F. The engine is operated at a speed of 600 r.p.m. with a spark advance of 13° before top dead center. This method is more fully described in Test Procedure D-908-55 contained in the 1956 edition of "ASTM Manual of Engine Test Methods for Rating Fuels." The base fuel employed in making this test was a synthetic mixture which is representative of commercial gasolines in present production. It is used since it gives a standard antiknock response and reproducible data. The synthetic mixture consists of 20 percent by volume of diisobutylene, 20 percent by volume of toluene, 20 percent by volume of isooctane, and 40 percent by volume of n-heptane. The synthetic fuel containing no antiknock additive was tested and found to have a research octane number of 91.3. When one gram of nickel per gallon in the form of cyclopentadienyl nickel nitrosyl was added to this base fuel, its research octane number was increased to 93.8. When the base fuel contained 2.0 grams of nickel per gallon as cyclopentadienyl nickel nitrosyl, its research octane number was increased to 95.0.

In addition, the cyclopentadienyl nickel nitrosyl compound was evaluated as a supplemental antiknock. In this evaluation, one gram of nickel per gallon, as cyclopentadienyl nickel nitrosyl, when blended with a fuel containing three milliliters of tetraethyllead per gallon gave an increase of 3.4 octane numbers over that obtainable by the tetraethyllead alone.

Having fully disclosed our process in the foregoing examples and discussion, we desire to be limited only within the scope of the appended claims.

We claim:

1. Process for formation of a cyclomatic nickel nitrosyl compound in which the cyclomatic group is a hydrocarbon radical containing from 5 to about 13 carbon atoms and is selected from the class consisting of the cyclopentadienyl radical, the indenyl radical, and hydrocarbon substituted cyclopentadienyl and indenyl radicals, wherein the hydrocarbon substituents are selected from the class consisting of alkyl, cyclohexyl, phenyl, alkylphenyl and phenylalkyl radicals, said process comprising reacting the corresponding monomeric cyclomatic hydrocarbon compound, nickel tetracarbonyl, and nitric oxide.

2. The process of claim 1 wherein the reaction is carried out in essentially the liquid phase.

3. The process of claim 1 wherein the reaction is carried out in essentially the gaseous phase.

4. The process of claim 1 in which said cyclomatic hydrocarbon compound is a cyclopentadiene compound containing a single 5-membered carbon ring.

5. The process of claim 1 in which a molar excess of said cyclomatic hydrocarbon compound and said nitric oxide are employed.

6. Process for the formation of cyclopentadienyl nickel nitrosyl comprising reacting cyclopentadiene, nickel tetracarbonyl and nitric oxide.

7. The process of claim 6 wherein a molar excess of cyclopentadiene and nitric oxide is employed.

References Cited in the file of this patent

UNITED STATES PATENTS 2,810,736    Catlin et al. _____ Oct. 27, 1957

OTHER REFERENCES

Abstract of Article, by Fischer et al., in "Chem. Abstracts," vol. 50 (1956), col. 12036g.

J. Inorganic & Nuclear Chem. (1955), vol. 1, pp. 165 and 166.